(12) United States Patent
Balgañón Canela et al.

(10) Patent No.: US 11,694,051 B2
(45) Date of Patent: *Jul. 4, 2023

(54) PRODUCT AUTHENTICATION SYSTEM

(71) Applicant: PACKAGING INNOVATION, S. DE R.L., Panamá-República (PA)

(72) Inventors: Pedro Balgañón Canela, Barcelona (ES); Carlos Mendoza, Mérida (MX)

(73) Assignee: PACKAGING INNOVATION, S. DE R.L., Panamá-República (PA)

( * ) Notice: Subject to any disclaimer, the term of this patent is extended or adjusted under 35 U.S.C. 154(b) by 342 days.

This patent is subject to a terminal disclaimer.

(21) Appl. No.: 17/182,308

(22) Filed: Feb. 23, 2021

(65) Prior Publication Data

US 2021/0342662 A1 Nov. 4, 2021

Related U.S. Application Data

(63) Continuation of application No. 17/088,687, filed on Nov. 4, 2020, now Pat. No. 10,929,738.

(60) Provisional application No. 63/018,577, filed on May 1, 2020.

(51) Int. Cl.
| | |
|---|---|
| *G06K 19/07* | (2006.01) |
| *B65D 85/12* | (2006.01) |
| *H04W 4/80* | (2018.01) |
| *G06Q 30/0226* | (2023.01) |
| *H04W 4/38* | (2018.01) |
| *A24F 15/08* | (2006.01) |
| *H04W 12/50* | (2021.01) |

(52) U.S. Cl.
CPC .......... *G06K 19/0723* (2013.01); *A24F 15/08* (2013.01); *B65D 85/12* (2013.01); *G06Q 30/0226* (2013.01); *H04W 4/38* (2018.02); *H04W 4/80* (2018.02); *H04W 12/50* (2021.01)

(58) Field of Classification Search
CPC .......... G06K 19/0723; G06K 19/07726; A24F 15/08; B65D 85/12; B65D 2203/10; G06Q 30/0226; G06Q 30/018; G06Q 30/0185; G06Q 30/0225; H04W 4/38; H04W 4/80; H04W 12/50; H04W 12/63
See application file for complete search history.

(56) References Cited

U.S. PATENT DOCUMENTS

| | | | |
|---|---|---|---|
| 2009/0254572 A1* | 10/2009 | Redlich ................. | G06Q 10/06 |
| 2010/0250497 A1* | 9/2010 | Redlich ................ | H04L 63/105 |
| | | | 707/661 |
| 2014/0201126 A1* | 7/2014 | Zadeh .................... | A61B 5/165 |
| | | | 706/52 |

(Continued)

*Primary Examiner* — Ankur Jain
(74) *Attorney, Agent, or Firm* — Mark Terry

(57) ABSTRACT

A method and system for authenticating a variety of consumer products is provided. The system includes a plurality of near field communication (NFC) tags configured for coupling to a variety of consumer products, the tags programmed to provide identifying data associated with a single consumer product to an NFC-capable mobile computing device, the NFC having a structure that detects opening of the consumer product, a central database for storing said data, a server communicably connected to a communications network and configured to access the database, and a mobile application executing on a mobile computing device, configured to read said identifying data from the NFC tag and communicate said identifying data to the server.

10 Claims, 13 Drawing Sheets

(56) References Cited

U.S. PATENT DOCUMENTS

2018/0204111 A1\* 7/2018 Zadeh .................. G06V 10/764
2020/0184278 A1\* 6/2020 Zadeh .................... G06N 3/044

\* cited by examiner

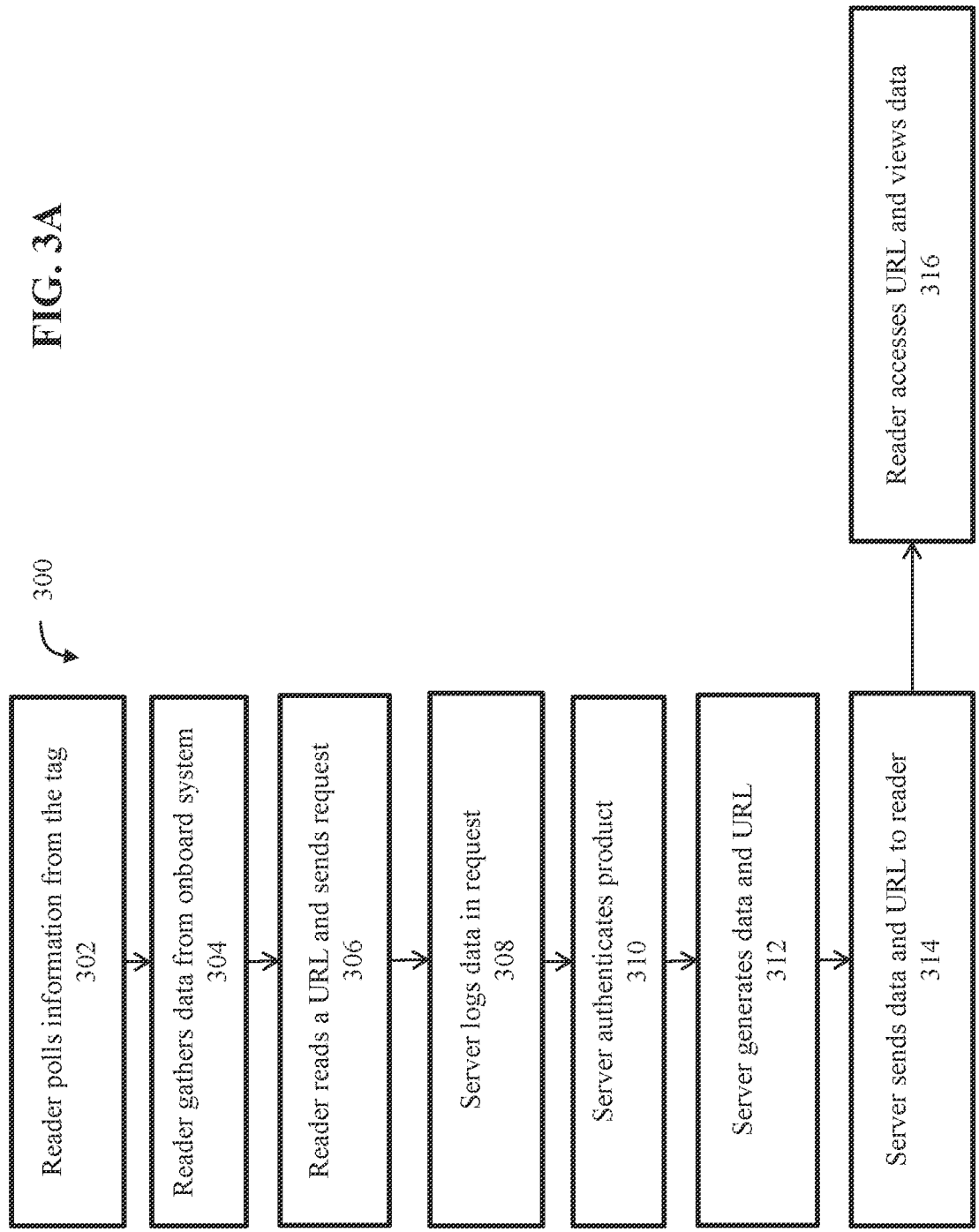

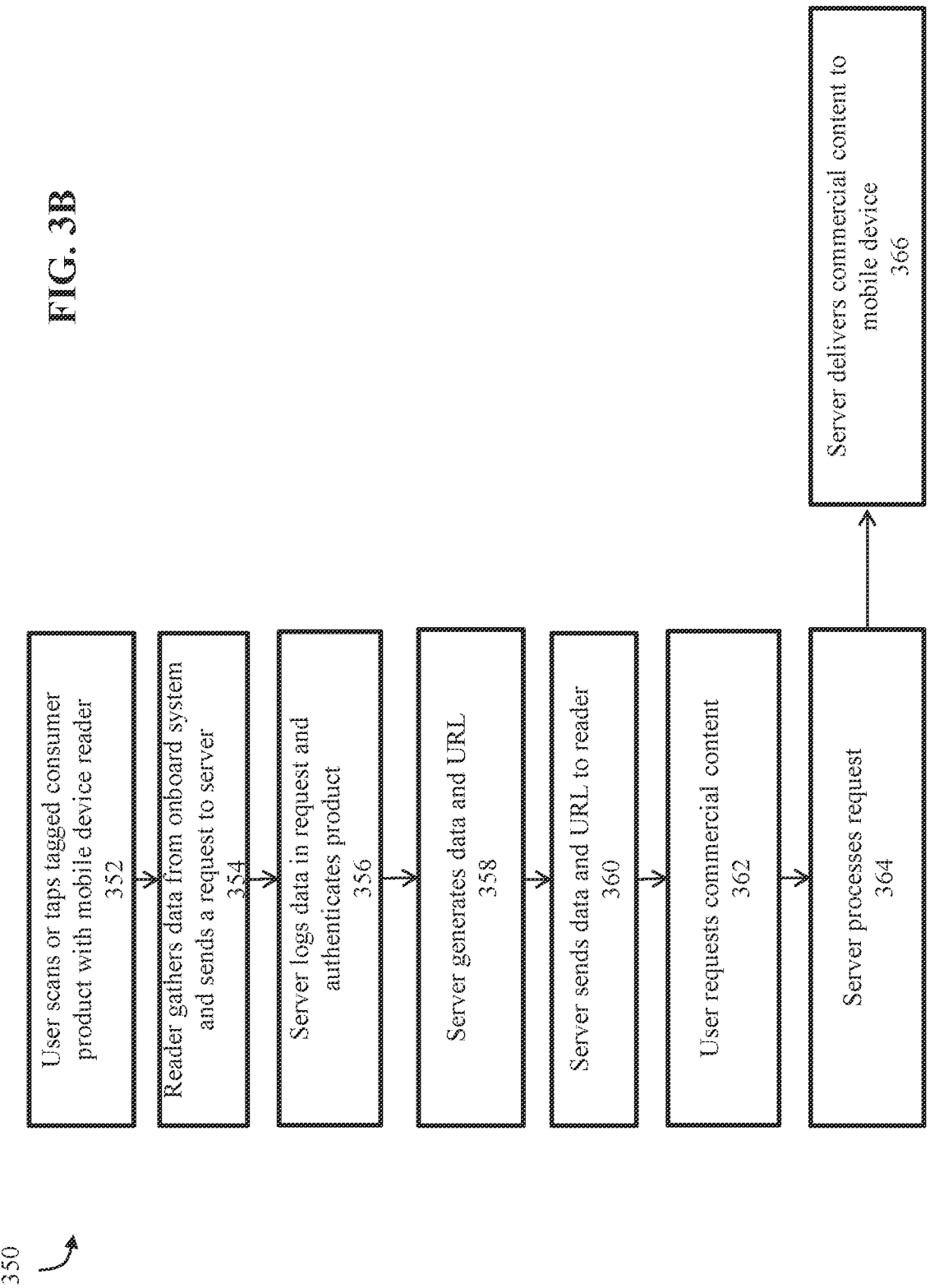

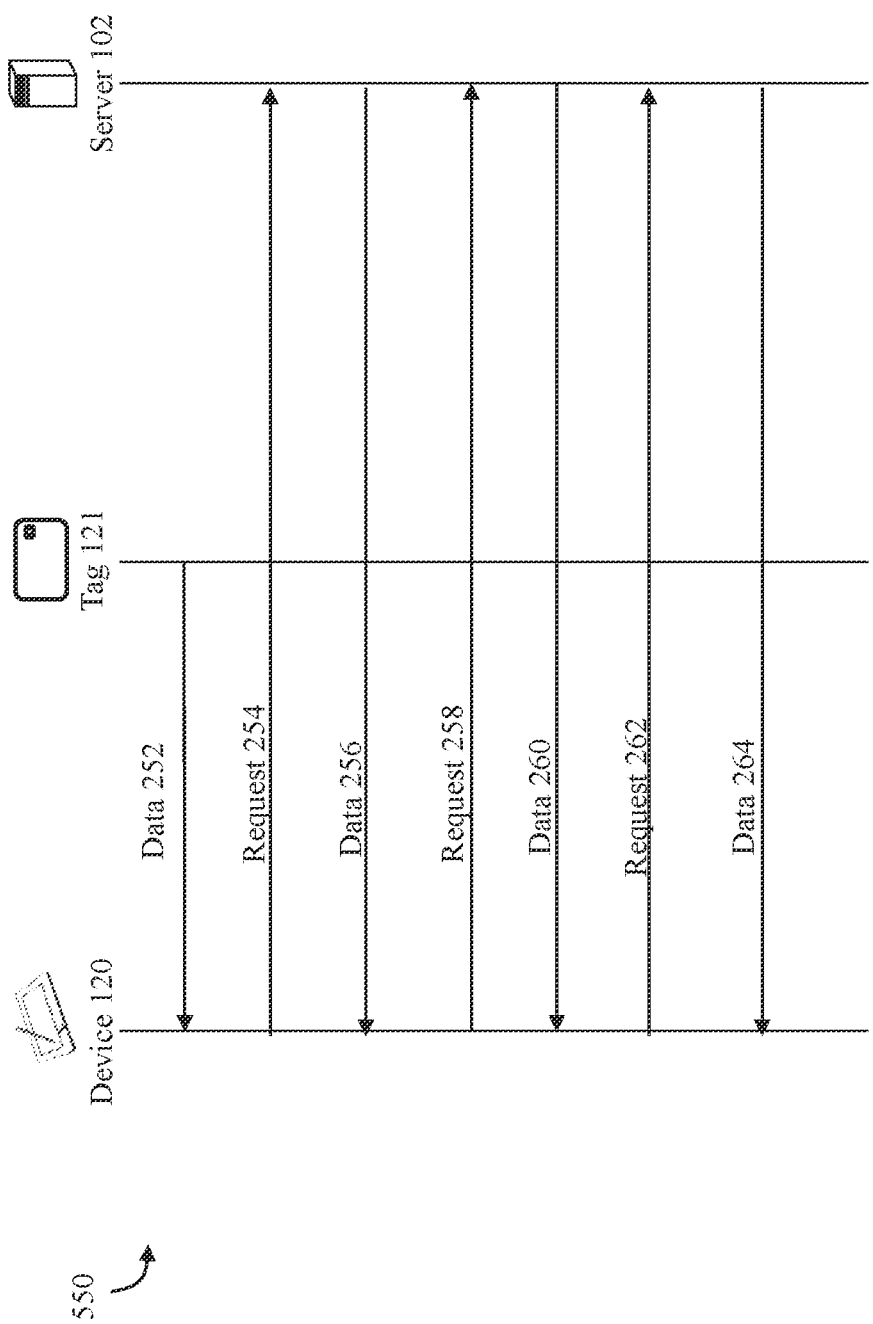

PRODUCT AUTHENTICATION SYSTEM

CROSS-REFERENCE TO RELATED APPLICATIONS

This patent application is a continuation of, and claims priority to, patent application Ser. No. 17/088,687 filed Nov. 4, 2020, which claims priority to provisional patent application 63/018,577 filed May 1, 2020 and titled "Product Authentication System." The subject matter of patent application Ser. No. 17/088,687 and 63/018,577 are hereby incorporated by reference in their entirety.

STATEMENT REGARDING FEDERALLY SPONSORED RESEARCH OR DEVELOPMENT

Not applicable.

INCORPORATION BY REFERENCE OF MATERIAL SUBMITTED ON A COMPACT DISC

Not applicable.

TECHNICAL FIELD

Not applicable.

BACKGROUND

The authenticity of consumer products has consistently been of the utmost importance to consumers and vendors alike. In the technological age, verifying the authenticity of products has become both increasingly important and challenging as the methods of counterfeiting have improved and the distance between manufacturers and consumers has grown further apart. Studies by the Organization for Economic Co-operation and Development estimated that in 2019 the global market for counterfeit goods reached $501,000,000,000 (501 Billion USD). This number is up 0.8% from the previous year and is growing at an unprecedented rate. According to the Commission on the Theft of American Intellectually Property, this results in estimated lost revenue of anywhere from 255 billion dollars to 600 billion dollars annually for US companies and industries alone.

There are currently various methods of authenticating a product or showing its authenticity to the end user. These exist largely in market areas that battle higher levels of counterfeiting, with the fashion or cigar industries as prime examples. In many cases, vendors or consumers looking to verify the authenticity of a pair of shoes or a handbag resort to close and tedious examination of the details of the product. This includes searching for specific types of stitching, semi-concealed marks, or comparing the tags inside or on the product with the tags on the packaging when available. Carrying out these examinations leave vendors and consumers susceptible to human error in investigation and often do not guarantee the authenticity of the product, as many counterfeiters are privy to the steps taken to verify authenticity and consider them when replicating a product. In addition, this may result in increased labor costs to vendors and lower profit margins.

Some companies use other methods or systems for facilitating authentication, the existing systems and methods taking various forms and typically being tightly catered to the specific type of product the manufacturer or vendor is looking to sell. For example, many limited-release shoes can be found to include zip-tie authenticators that generally contain information about the product like the product name, its source, and the release batch printed on the tag of the zip-tie. Other industries, such as the cigar industry, regulate the authenticity of its products by publishing guides to help the end-user verify the authenticity or including Warranty Seals which require close examination and may require the use of tools, like a magnifying glass. As was the case with the previously mentioned authentication processes, tags and seals can similarly be replicated by counterfeiters. In addition, it places an unreasonable burden on the consumer or vendor who may not be knowledgeable or skilled enough to detect the minute details that the original manufacturer may have included to convey authenticity.

While many of these methods of authentication prove successful at times, they tend to only provide confirmation of the product's source and intended nature, quality, or presentation. They are less successful in conveying whether a product or its packaging has been tampered with, whether the product has been opened and/or used, pertinent product and warranty information, or information surrounding the product such as potential uses, similar or complimentary products, and other information that the consumer may find important or beneficial.

Due to the shortfalls of the currently existing methods and systems of product authentication, a need exists for a system and method for users to verify the authenticity of a product quickly and easily they have purchased or are looking to purchase. Specifically, a need exists for a centralized system and method of product authentication, package quality verification, and product related content delivery.

SUMMARY

A method and system for authenticating a variety of consumer products is provided. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claim subject matter's scope.

In one embodiment, system for facilitating the authentication of consumer products includes a near field communication (NFC) tag configured for coupling to the consumer product, wherein said NFC tag is programmed to provide the following identifying data to an NFC-capable mobile computing device when said NFC tag is tapped or scanned: a unique product identifier, a URL containing an encrypted packet that uniquely identifies said NFC tag, and a counter value that represents a number of times said NFC tag has been tapped or scanned, the NFC tag comprising a main portion adhered to a stationary portion of the cigar box, and a lead portion adhered to a movable portion of the cigar box, wherein when the movable portion is moved, the lead portion is detached from the main portion, and the NFC tag is configured to record that the cigar box has been opened, a database for storing data about a plurality of consumer products, including a product name, a unique product identifier, a counter value, a hash algorithm and a unique identifier, wherein said database is communicatively coupled to a communications network, a mobile application executing on an NFC-capable mobile computing device communicatively coupled to the communications network, wherein said mobile application is configured to read identifying data from the NFC tag and transmit said identifying data to a server via the communications network, and the server communicably coupled with the communications network, wherein the server is configured for: a) receiving said identifying data from the mobile application, b) accessing a record in the database that corresponds to the unique product identifier, c) comparing the hash in the identifying data to a hash algorithm in the record, and comparing the counter value of the identifying data to a counter value in the record, and d) if the hash in the identifying data matches the hash algorithm in the record, and if the counter value of the identifying data matches the counter value in the record, then transmitting an approval of authentication to the mobile application.

In another embodiment, a method for facilitating the authentication of consumer products includes coupling a near field communication (NFC) tag to the consumer product, wherein said NFC tag is programmed to provide the following identifying data to an NFC-capable mobile computing device when said NFC tag is tapped or scanned: a unique product identifier, a URL containing an encrypted packet that uniquely identifies said NFC tag, and a counter value that represents a number of times said NFC tag has been tapped or scanned, the NFC tag comprising a main portion adhered to a stationary portion of the cigar box, and a lead portion adhered to a movable portion of the cigar box, wherein when the movable portion is moved, the lead portion is detached from the main portion, and the NFC tag is configured to record that the cigar box has been opened, storing in a database data about a plurality of consumer products, including a product name, a unique product identifier, a counter value, a hash algorithm and a unique identifier, wherein said database is communicatively coupled to a communications network, executing a mobile application on an NFC-capable mobile computing device communicatively coupled to the communications network, wherein said mobile application is configured to read identifying data from the NFC tag and transmit said identifying data to a server via the communications network, receiving, on the server communicably coupled with the communications network, said identifying data from the mobile application, accessing, by the server, a record in the database that corresponds to the unique product identifier, comparing, by the server, the hash in the identifying data to a hash algorithm in the record, and comparing the counter value of the identifying data to a counter value in the record, and if the hash in the identifying data matches the hash algorithm in the record, and if the counter value of the identifying data matches the counter value in the record, then transmitting, by the server, an approval of authentication to the mobile application.

BRIEF DESCRIPTION OF THE DRAWINGS

The accompanying drawings, which are incorporated in and constitute a part of this disclosure, illustrate various example embodiments. In the drawings:

FIG. 3A is a flow chart of a method for identifying a product for authentication and returning the related results to the reader, according to an example embodiment;

FIG. 3B is a flow chart of a method for disseminating commercial content about a variety of consumer products, according to an example embodiment;

FIG. 5B is a diagram showing the interaction between a tag on a consumer product, a consumer mobile device, and a server during the process for facilitating the dissemination of commercial content about a variety of consumer products, according to an example embodiment;

DETAILED DESCRIPTION

Figure 1:
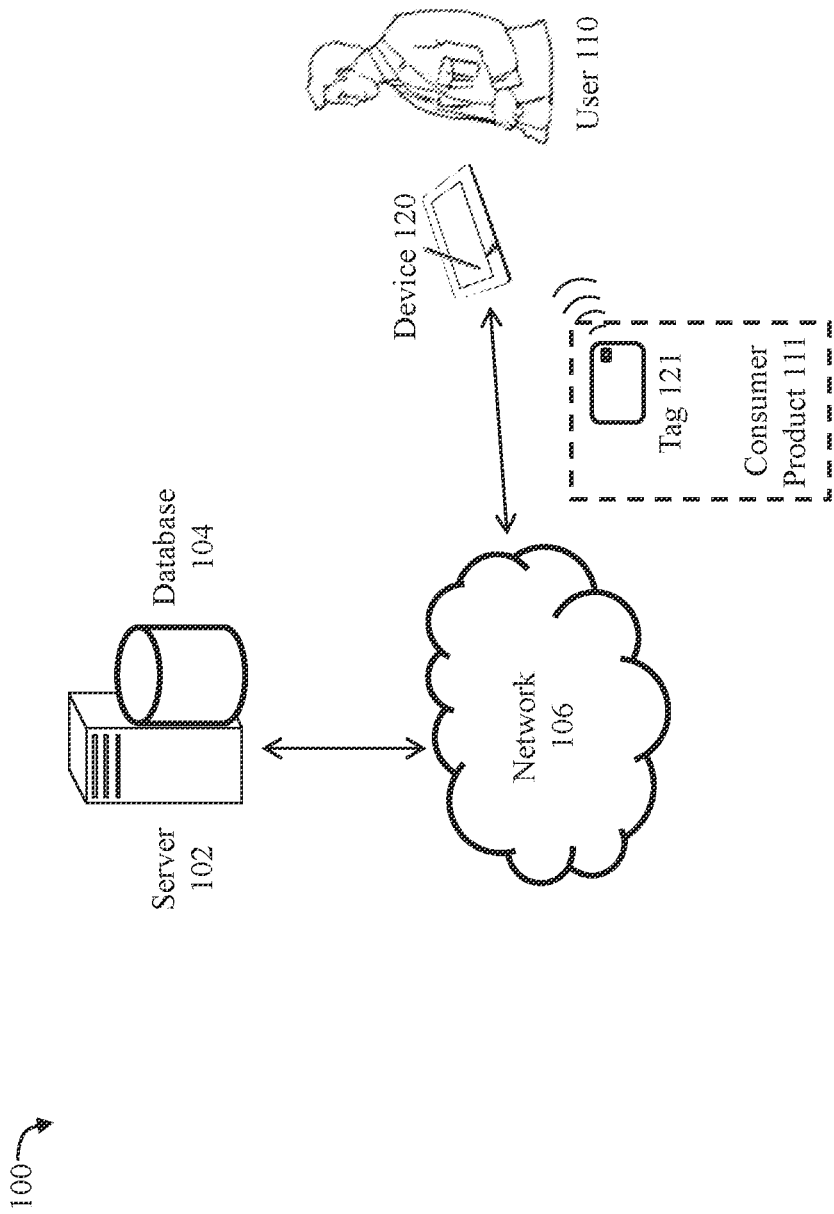
FIG. 1 is a block diagram of an operating environment that supports a process for facilitating the authentication of, and interaction with, a variety of consumer products, according to an example embodiment.

The following detailed description refers to the accompanying drawings. Wherever possible, the same reference numbers are used in the drawings and the following description to refer to the same or similar elements. While embodiments may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the claimed subject matter. Instead, the proper scope of the claimed subject matter is defined by the appended claims.

The claimed subject matter improves over the prior art by providing a simple, cost-effective and user-friendly method for authenticating consumer products and providing end-users with relevant product and commercial content. The claimed subject matter reduces or eliminates the risk of purchasing or selling counterfeit products since it quickly and conveniently provides a user with information regarding the authenticity of the product at question, as well as information about its use, source, and other relevant information. Also, the claimed subject matter reduces the amount of time and money a consumer or business may spend inspecting products for authenticity by eliminating the need for manual inspection and authentication. In addition, the claimed subject matter helps the consumer access information about their product including warranty information, exclusive commercial content, interactive content, and other content relevant to the product and consumer. Therefore, the claimed subject matter reduces or eliminates the burden placed on consumers, vendors, and manufacturers looking to verify or convey the authenticity of a consumer product.

FIG. 1 is a block diagram of an operating environment 100 that supports a method and system for verifying the authenticity of a consumer product on a server communicatively coupled with a communications network 106. The server 102 or device 120 may be communicatively coupled with a communications network 106, according to an example embodiment. The environment 100 may comprise mobile computing device 120, which may communicate with server 102 via a communications network 106. Mobile computing device 120 may comprise a cellular/mobile telephone, smart phone, tablet computer, laptop computer, handheld computer, desktop computer, wearable computer, or the like. The mobile computing device 120 may be connected either wirelessly or in a wired or fiber optic form to the communications network 106. Communications network 106 may be a packet switched network, such as the Internet, or any local area network, wide area network, enterprise private network, cellular network, phone network, mobile communications network, or any combination of the above.

FIG. 1 also shows an identification device or tag 121 placed on, in, or around consumer product 111. Tag 121 may be a near field communication (NFC) tag that emits radio frequency signals that comport with the ISO/IEC 18092 and ECMA 340 communications protocol standards. Tag 121 may also include encryption and authentication standards such as those described in ISO/IEC 18000, 29167 and ISO/IEC 20248. The tag 121 may also store additional data about a consumer product, such as any of the data in the consumer product's record, described in further detail below. In generally, the tag 121 may be any radio frequency device that is configured to transmit a radio frequency signal that is readable over short distances. The tag 121 may also be configured for attachment to product packaging in such a way that the tag is able to detect if the product packaging has been opened. For example, one or more conductive terminals may be disposed on the surface of the tag and the surface of the tag may be applied (such as by adhesive) to the product packaging along a rip line or other line in which the product must be opened. When the product packaging is opened, the one or more conductive terminals are no longer conductively coupled, which may be detected by the tag. The tag 121 may also include temperature and humidity data and be configured to keep a log of temperature and humidity data regarding shipment and storage of the consumer product to which it is affixed.

The environment 100 shows that device 120 is operated by a user 110, which may be a consumer. The term "consumer" is used to refer to a person, an end-user of the consumer product 111, a retailer of the consumer product, a distributor of the consumer product, an intermediate user of the consumer product, or the like. Server 102, tag 121 and device 120 may each comprise a computing device 600, described below in greater detail with respect to FIG. 6.

In another embodiment, the device 120 may also calculate current geographical position (otherwise referred to as geographical location data) using a sub-system, an on-board processor or a connected processor. In one embodiment, the device 120 may calculate current position using a satellite or ground based positioning system, such as a Global Positioning System (GPS) system, which is a navigation device that receives satellite or land based signals for the purpose of determining the device's current geographical position on Earth. Generally, device 120 calculates global navigation satellite system (GNSS) data. A GNSS or GPS receiver, and its accompanying processor, may calculate latitude, longitude and altitude information. In this document, the terms GNSS and GPS are used generally to refer to any global navigation satellite system, such as GLONASS, GALILEO, GPS, etc. In this embodiment, a radio frequency signal is received from a satellite or ground based transmitter comprising a time the signal was transmitted and a position of the transmitter. Subsequently, the device 120 calculates current geographical location data of the device based on the signal. In another embodiment, the device 120 calculates current geographical location using alternative services, such as control plan locating, GSM localization, dead reckoning, or any combination of the aforementioned position services. The term spatial technologies or spatial processes refers generally to any processes and systems for determining one's position using radio signals received from various sources, including satellite sources, land-based sources and the like.

Computing device 102 includes a software engine that delivers applications, data, program code and other information to networked devices, such as device 120. The software engine of device 102 may perform other processes such as transferring multimedia data in a stream of packets that are interpreted and rendered by a software application as the packets arrive. FIG. 1 further shows that device 102 includes a database or repository 104, which may be a relational database comprising a Structured Query Language (SQL) database stored in a SQL server. Mobile computing device 120 may also include its own database, either locally or via the cloud. The database 104 may serve user identifying data, as well as related information from a product's corresponding product record (located in database 104), which may be used by device 102 and mobile computing device 120.

Device 102, mobile computing device 120 and tag 121 may each include program logic comprising computer source code, scripting language code or interpreted language code that perform various functions of the disclosed embodiments. In one embodiment, the aforementioned program logic may comprise program module 606 in FIG. 6. It should be noted that although FIG. 1 shows only one mobile computing device 120, one tag 121 and one server 102, the system of the disclosed embodiments supports any number of servers, tags and mobile computing devices connected via network 106. Also note that although server 102 is shown as a single and independent entity, in one embodiment, server 102 and its functionality can be realized in a centralized fashion in one computer system or in a distributed fashion wherein different elements are spread across several interconnected computer systems.

The database 104 may include a consumer product record for each consumer product 111. A consumer product record may include: the consumer product name, a consumer product identifier, information about the authenticity of the consumer product, consumer product packaging information, exclusive commercial content relating to the consumer product, pairings relating to the consumer product, instructions for use related to the consumer product, warranty information, rewards or benefits related to the consumer product, interactive content, augmented reality media, information regarding upcoming events related to the brand of the consumer product, information regarding integration with social networks, redirect links to the vendor or manufacturer's website, nearby events relating to the consumer product, etc. A consumer product record may further include a unique code, such as a UPC code or a QR code, corresponding to the consumer product.

A consumer product record may also include a unique identifier. A unique identifier is an identifier that is registered to a specific unit of the consumer product. Unique identifiers avoid shortcomings that are associated with the use of product identifiers alone, giving each unit of the consumer product its own identifier to facilitate in the recognition and verification of authenticity of the consumer product.

Figure 2A:
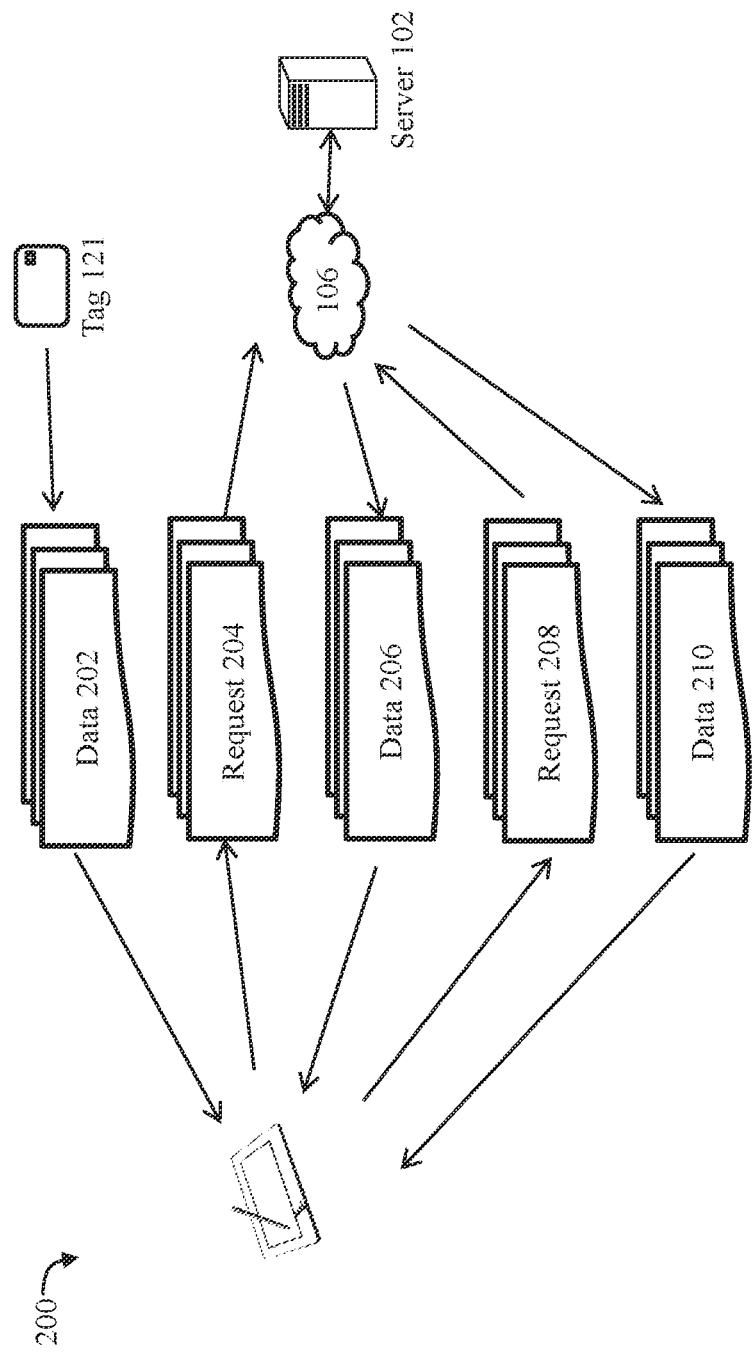
FIG. 2A is a diagram showing the data flow of the process for facilitating the authentication of and interaction with a variety of consumer products, according to an example embodiment.
Figure 5A:
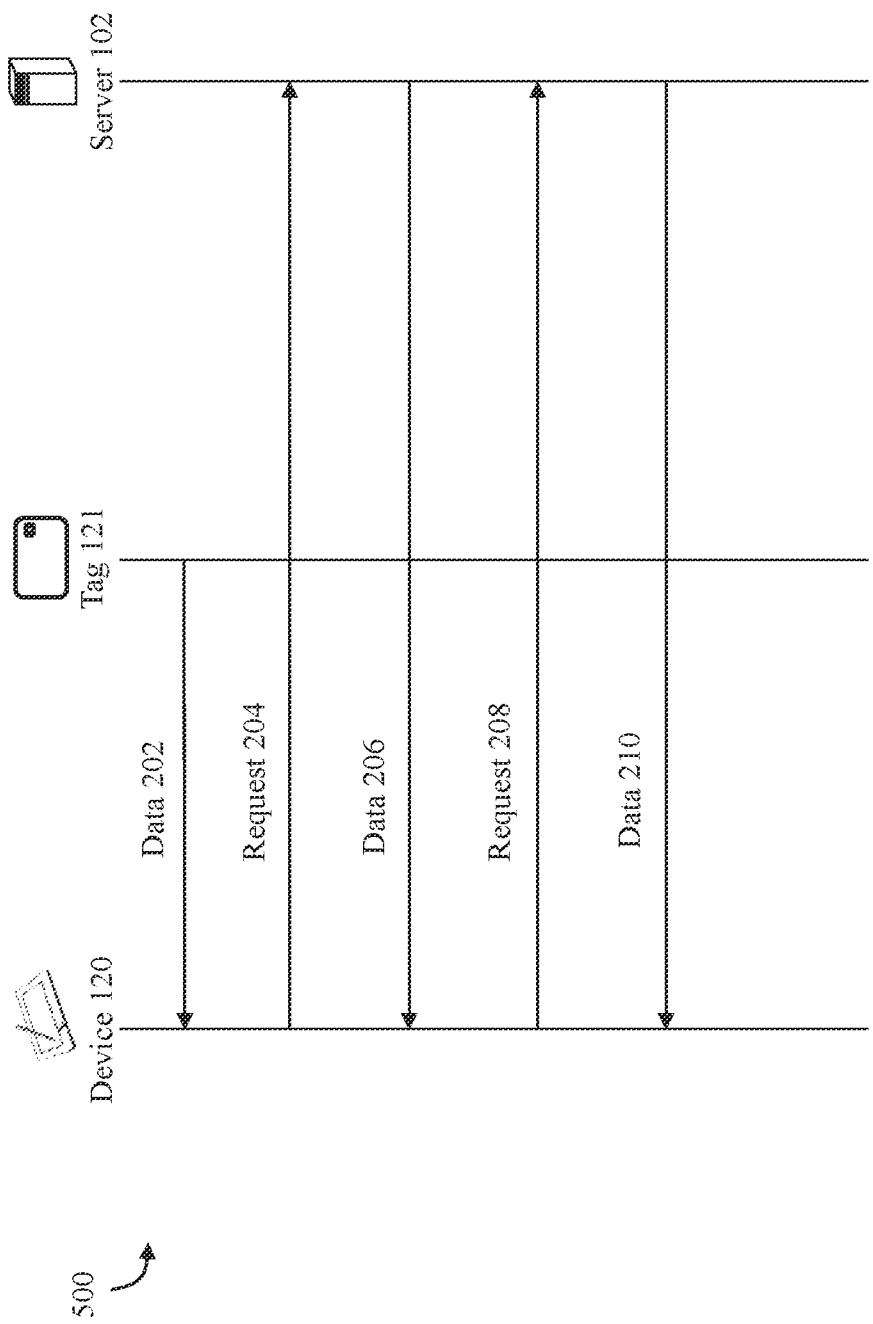
FIG. 5A is a diagram showing the interaction between a tag on a consumer product, a consumer mobile device, and a server during the process of authentication of and interaction with a variety of consumer products, according to an example embodiment.

The method and system for verifying a consumer product is described in more detail below, with reference to FIGS. 2A, 3A and 5A. FIG. 2A is a diagram showing the data flow 200 of the process for facilitating the authentication of and interaction with a variety of consumer products, FIG. 3A is a flow chart 300 of a method for identifying a product for authentication and returning the related results to the reader, and FIG. 5A is a diagram 500 showing the interaction between a tag on a consumer product, a consumer mobile device, and a server during the process of authentication of, and interaction with, a variety of consumer products.

Figure 3C:
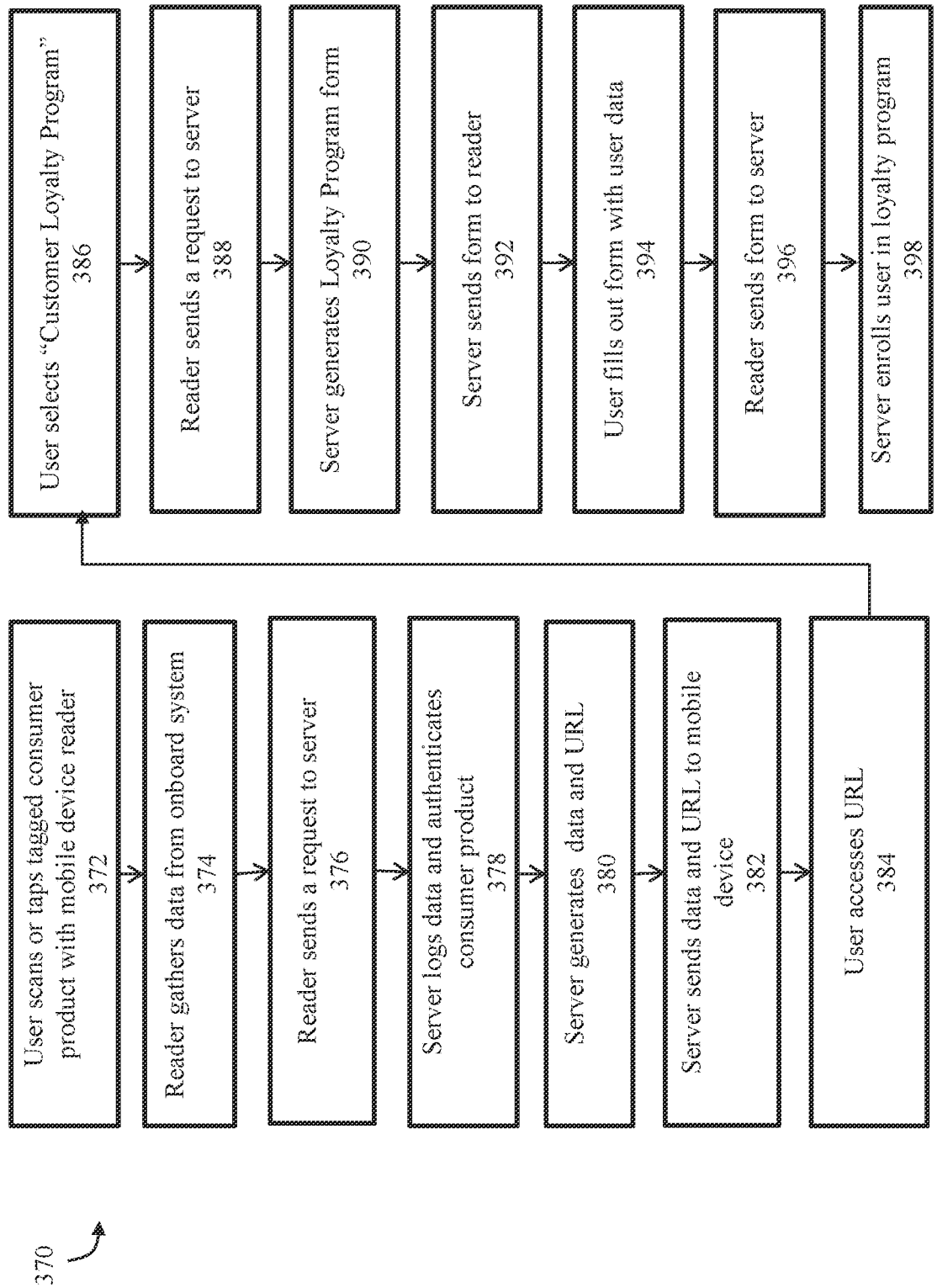
FIG. 3C is a flow chart of a method for administering a consumer loyalty program for a variety of consumer products, according to an example embodiment.
Figure 4:
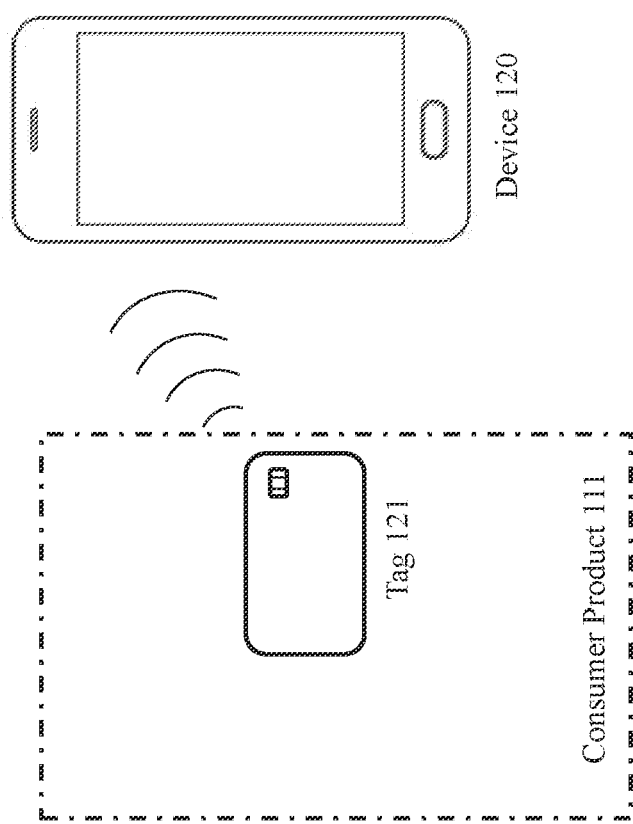
FIG. 4 is a drawing depicting the process of transmitting data from a tag on a consumer product to a consumer mobile device, according to an example embodiment.

The process of authenticating a consumer product 111 begins with step 302 of FIG. 3A. In step 302, the reader on mobile device 120 polls information 202 from the tag 121. For reference, FIG. 4 shows the tag 121 placed in close proximity to the mobile device 120 (also be referred to herein as "reader") to initiate the process of FIG. 3A. This process is initiated by the user 110 by either tapping or scanning the NFC tag, depending on which type of tag has been placed on the consumer product 111 or its packaging.

In step 302, in one option, some or all of the data 202 read by device 120 is displayed on device 120. This may include, for example, the consumer product name, a product identifier, a unique identifier, a product description, warranty information, and/or a photo of the product. In another embodiment, the data 202 includes a hash that is produced by the tag 121 wherein encoded in said hash is the unique identifier that identifies the tag itself. The hash may be referred to as an encrypted packet that includes the unique identifier that identifies the tag itself. The data 202 may also include a counter, which is a numerical value that represents how many times the tag 121 has been tapped to provide data 202, and which is increased sequentially each time the tag is tapped. The data 202 may also include a URL that includes both the unique identifier that identifies the tag itself and the counter as parameters in the URL. The data 202 may also include a value that indicates whether the product packaging has been opened yet. The data 202 may also include any data that the tag is capable of storing.

In step 304, the reader on the device 120 gathers data 202 (also see FIGS. 2A and 5A) from the onboard system, and in step 306 the reader generates a URL, and sends a request 204 via the network 106 to the server 102. The data sent in request 204 may include the product identifier and unique identifier which the server will use to process the request, authenticate the consumer product, and return the relevant information. This will be explained in further detail below in steps 308-316. The data sent to the server may also include the hash described above, the unique identifier that identifies the tag itself and the counter as parameters in the URL.

Next, in step 308, the server processes and logs the data from the request 204 sent in step 306. The product identifier and unique identifier sent in the request are used in this step by the server to identify the correct product record in database 104 and ensure that all of the relevant information and the authentication will be transmitted to the user 110 via the device 120.

Once the server has logged the data, the product is authenticated in step 310 using the unique identifier. In step 310, the server may use mirroring processes and reading counter processes to authenticate the product. Mirroring processes are replica processes for services accessible through the communications protocol, wherein identical or near-identical authentication processes are executed. In step 312, the server generates data and a URL containing the relevant consumer product information pulled from database 104 that is to be conveyed to the user 110 via the mobile device 120. This information may include the information previously disclosed to the user, as well as information regarding the authenticity of the product, warranty information, links to exclusive commercial content and loyalty programs sign-up pages, interactive content, and any other content relevant to the product and consumer.

In one embodiment, the server 102 may compare any of the data 204 (that was sent to the server) to data located in a product record (in database 104) that corresponds to the product identifier in the data 204. If any of the data does not match, then there is a denial of validation and authentication. If all said data matches, then there is a validation and authentication that occurs. In one embodiment, the server 102 may also compare the counter value in data 204 to a running counter value located in the product record that corresponds to the product identifier in the data 204. If the counter value does not match, then there is a denial of validation and authentication. If the counter value matches, then there is a validation and authentication that occurs. In another embodiment, the server 102 may also compare the hash in data 204 to the result of a hash algorithm located in the product record that corresponds to the product identifier in the data 204. If the values do not match, then there is a denial of validation and authentication. If the values match, then there is a validation and authentication that occurs.

In step 314, the server transmits said data and URL (i.e., data 206) to the reader over the communications network, wherein a web page located at said URL includes the data pulled from database 104 and is configured for the user to interact therein.

In step 316, the user engages with the mobile device 120 to access the URL and view the data 206 delivered to the device by server 102 over the communications network 106. In step 316, the user may interact with the data in any manner permitted by the application, and in doing so may send additional requests 208 to the server 102 via the communications network 106. The server will then reengage in step 208 and log the data in the request before generating the new data 210 and URL, as shown in step 312. The server will then carry out step 314 and send the new data 210 and URL to the mobile device 120 for the user 110 to access and view, as described in step 316.

Additional functionality of server 102 is provided as follows. Once a consumer has navigated to the appropriate URL (see the processes described above), the consumer 110 may author and post comments, reviews or pairing suggestions about the consumer product 111. Additionally, the consumer 110 may engage in an online chat, and interact with, a manufacturer, a store, a retailer, distributor, other end users, etc. Also, the consumer 110 may engage in an online chat, and interact with, a brand or company regarding questions, complaints, etc. about the consumer product 111. In another embodiment, the server 102 may confirm when a sale of a consumer product 111 occurs (at a retailer, for example) and send confirmation of said sale to the brand, retailer, distributor, etc. in real time. Further, the server 102 may provide to retailers, distributors, etc. with certain online training tools, such as webinars, talks and courses that provide training regarding how to sell the consumer product 111 to end-consumers. Moreover, the mobile application is further configured to read from the NFC tag the temperature and humidity at which the consumer product has been situated during shipping and storage. Additional example processes are further described below with reference to FIGS. 3B and 3C.

Regarding the pairing functionality, once a consumer has navigated to the appropriate URL (see the processes described above), the consumer 110 may author and post comments and reviews about pairings for the consumer product 111. For example, if the consumer product were a wine, the consumer may author and post comments and reviews about food, and cigar pairings for the wine. In another example, if the consumer product were a cigar, the consumer may author and post comments and reviews about food/meal, and wine pairings for the cigar. In another example, if the consumer product were a liquor, the consumer may author and post comments and reviews about food/meal, and cigar pairings for the liquor. In one embodiment, an algorithm executing on the server 102 may suggest pairings for the consumer product 111. In one embodiment, the server 102 may include a communications module that puts the user 110 in contact with an expert that suggests pairings for the consumer product 111. For example, if the consumer product were a wine, the expert may be a sommelier. In another example, if the consumer product were a cigar, the expert may be a cigar aficionado. In another example, if the consumer product were a liquor, the expert may be a liquor expert.

Additional functionality of server 102 may include providing nearby smoking locations. Once a consumer has navigated to the appropriate URL (see the processes described above), the server 102 may suggest a nearby smoking location based on the current location of the user 110. If the consumer product were a cigar, the consumer would benefit from having quick and easy access to a smoking location. The server 102 receives the current location of the user 110 (as described more fully herein), and calculates the closest smoking location to the user's location, and subsequently displays this information to the user so that he may enjoy his cigar at said location. The server 102 may come up with a plurality of smoking locations within a preset distance from the user 110. In this case, the server 102 may filter the smoking location results by distance, type of establishment, etc. Once the consumer has navigated to the appropriate URL (see the processes described above), the consumer 110 may author and post comments and reviews about the smoking location(s) he utilized, so that other consumers may benefit from his review.

Figure 2B:
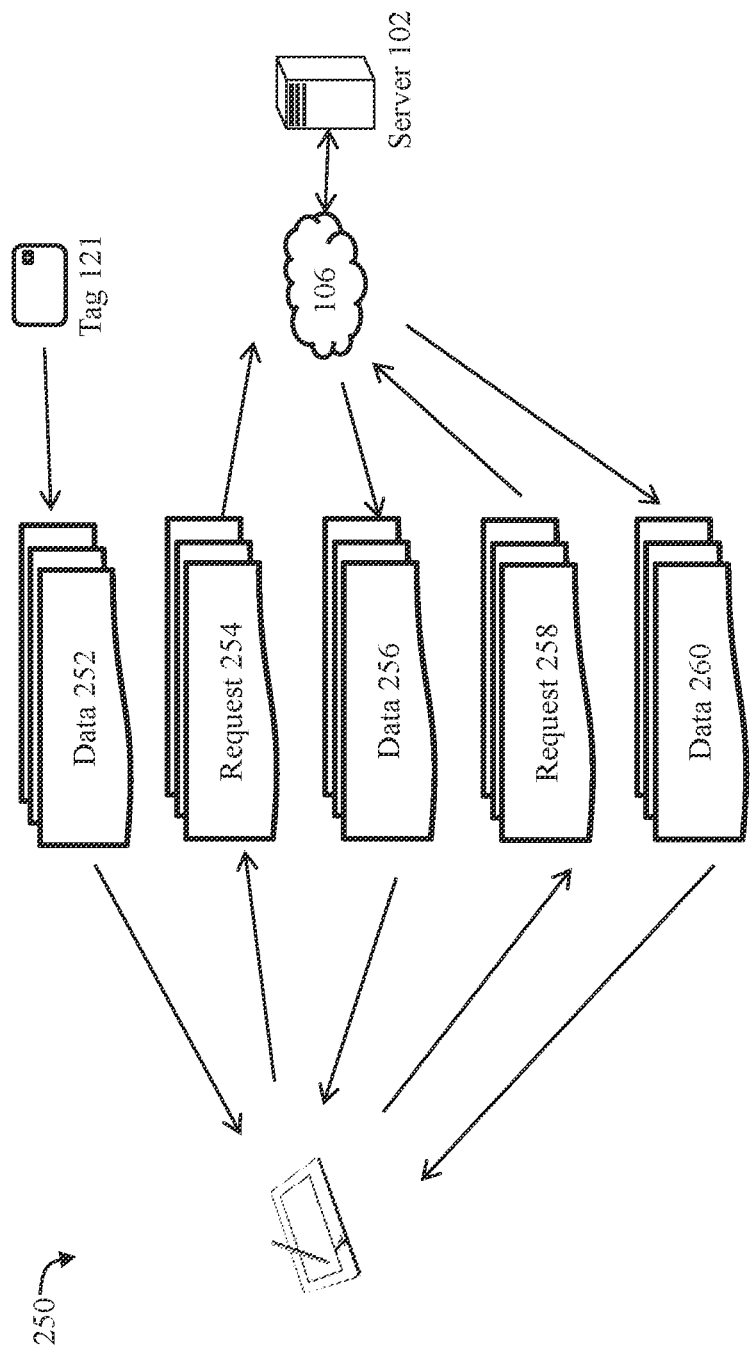
FIG. 2B is a diagram showing the data flow of a process for facilitating the dissemination of commercial content about a variety of consumer products, according to an example embodiment.

The method and system for providing commercial content such as webinars, videos, interactive virtual reality experiences, etc. is described in more detail below, with reference to FIGS. 2B, 3B and 5B. FIG. 2B is a diagram showing the data flow 250 of the process for facilitating the provision of commercial content regarding a variety of consumer products, FIG. 3B is a flow chart 350 of a method for the provision of commercial content regarding a variety of consumer products, and FIG. 5B is a diagram 550 showing the interaction between a tag on a consumer product, a consumer mobile device, and a server during the provision of commercial content regarding a variety of consumer products.

The method and system for providing commercial content begins with step 352 (see FIG. 3B), wherein the user 110 taps or scans the tag 121 on a consumer product 111 using device 120. Once the user has scanned or tapped the tagged consumer product, as shown in step 352, the reader gathers data 252 (see FIG. 2B) from the onboard system and sends a request 254 to the server. Once the server logs the data in the request and authenticates the product in step 356, the server generates data and a URL in step 358 and sends said data and URL 256 to the reader in step 360. The URL may contain any such commercial content as a manufacturer, retailer, brand, etc. may want to share with the end-user of their product. This may include information relating to upcoming events, infographics, websites, loyalty programs, blogs, videos, and any other commercial content deemed relevant to the related product. After deciding which commercial content to engage with, a user sends a request 258 for the selected commercial content in step 362. The request is processed by the server in step 364 and the relevant commercial content data 260 delivered to the user's mobile device in step 366.

Figure 2C:
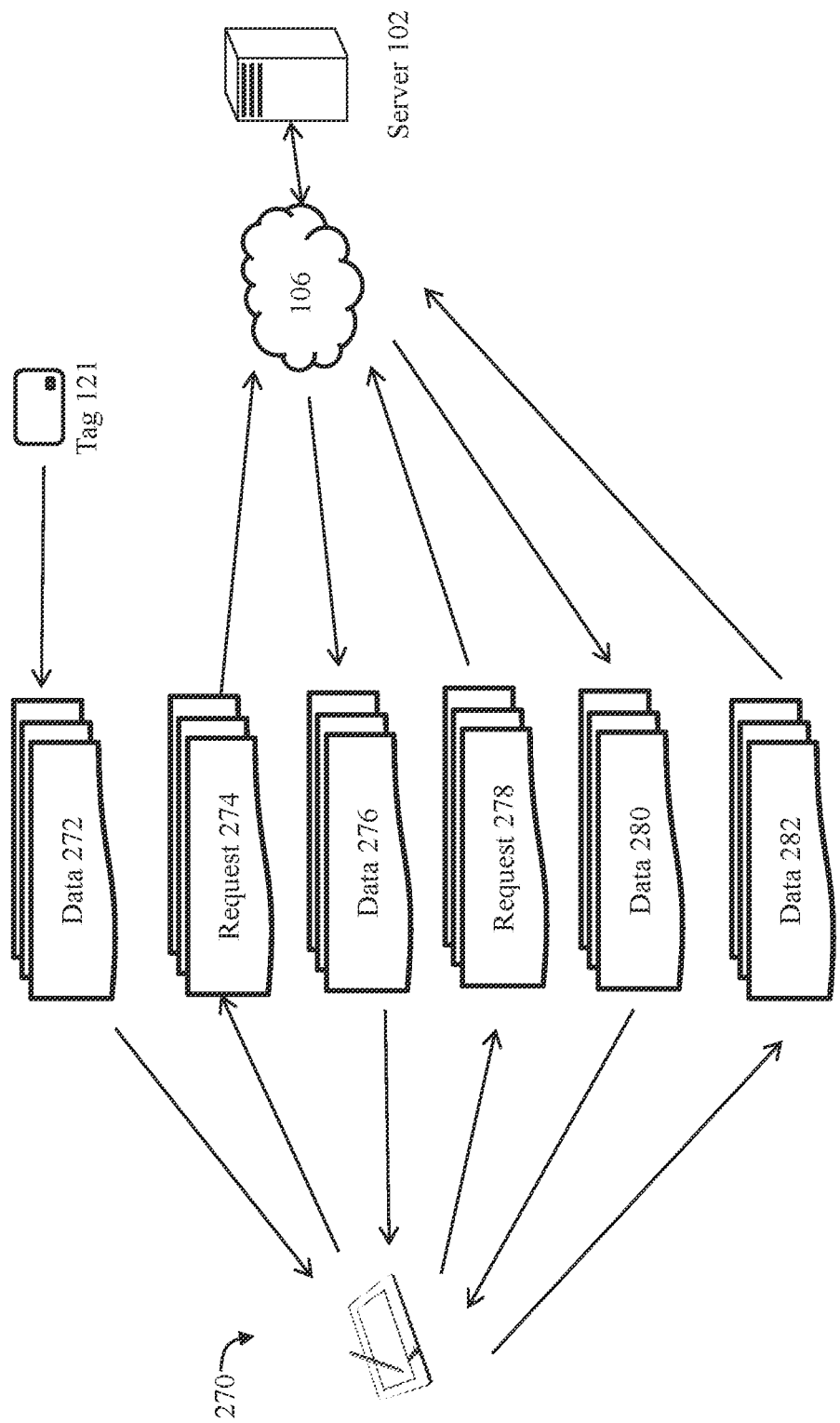
FIG. 2C is a diagram showing the data flow of the process for facilitating the administration of a consumer loyalty program for a variety of consumer products, according to an example embodiment.
Figure 5C:
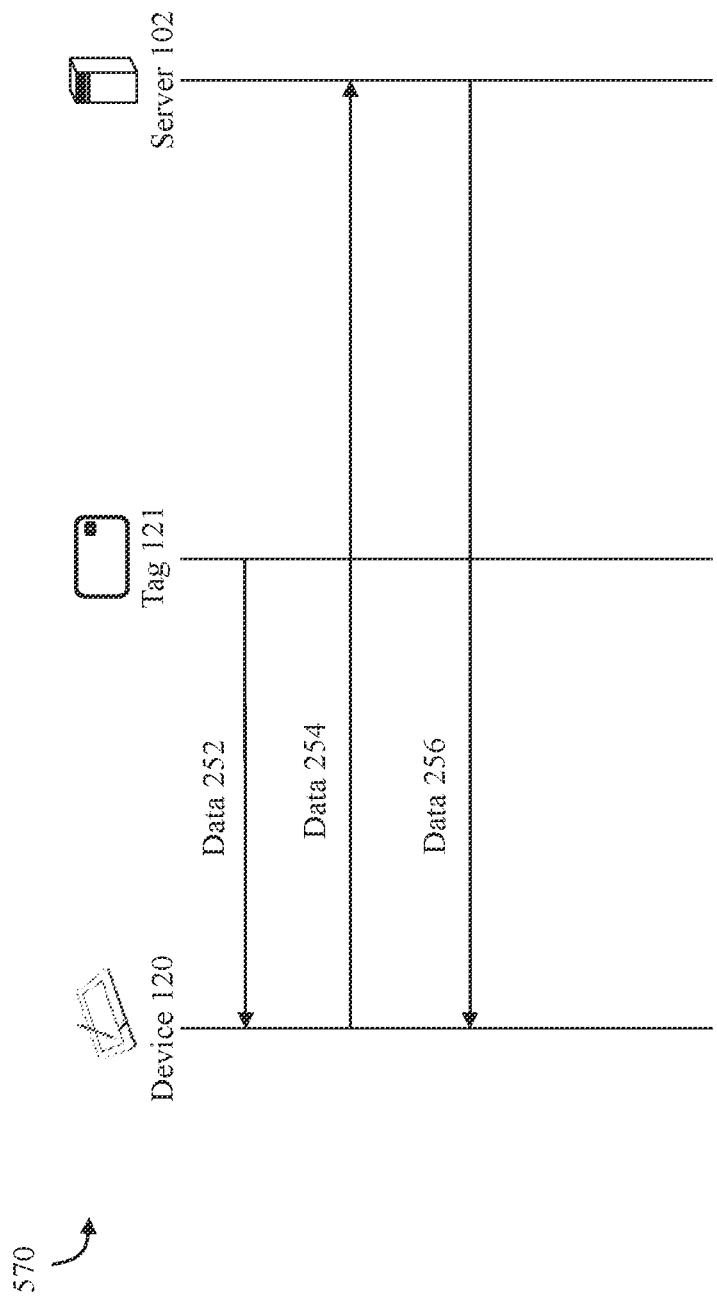
FIG. 5C is a diagram showing the interaction between a tag on a consumer product, a consumer mobile device, and a server during the process for facilitating the administration of a consumer loyalty program for a variety of consumer products, according to an example embodiment.

The method and system for enrolling and tracking progress in loyalty programs associated with the manufacturer or vendor of a consumer product is described in more detail below, with reference to FIGS. 2C, 3C and 5C. FIG. 2C is a diagram showing the data flow 270 of the process for facilitating the administration of a consumer loyalty program regarding a variety of consumer products, FIG. 3C is a flow chart 370 of a method for the administration of a consumer loyalty program regarding a variety of consumer products, and FIG. 5C is a diagram 570 showing the interaction between a tag on a consumer product, a consumer mobile device, and a server during the administration of a consumer loyalty program regarding a variety of consumer products.

The administration of a consumer loyalty program likewise begins with step 372 (see FIG. 3C), wherein the user 110 taps or scans the tag 121 on a consumer product 111 using device 120. In step 374 the reader gathers data 272 from the onboard system and sends a request 274 to the server in step 376. The server then logs the data, authenticates the product, and generates data and a URL in steps 378, and 380, respectively. The data and URL generated by the server are sent to reader/mobile device in step 382 utilizing data packet 276, thereby allowing the user to access said data and URL as shown in step 384. As mentioned above, the data and displayed materials on the URL page may include information regarding customer loyalty programs, commercial content, FDA status, etc. In step 386 the user selects "Customer Loyalty Program." The term "Customer Loyalty Program" is used in this embodiment as an example of displayed text used to signal to a user that upon interact with said text, they will be taken through the steps of enrolling in a loyalty program associated with the scanned product. Other embodiments may include any such text that conveys substantially the same message, such as "Loyalty Program Sign-Up" or other similar options.

Once a user has selected "Customer Loyalty Program," the reader sends a request 278 to server 102 in step 388. Upon receiving said request, the server generates a loyalty program form and sends it to the reader in steps 390 and 392 respectively, utilizing data packet 280. The user then fills out the form with user data in step 394 and the reader returns the form to the server via data packet 282, in step 396. User data may include any such data requested by a loyalty program owner, including but not limited to name, address, demographic data, email address, phone number, etc. The server enrolls the user in the relevant loyalty program upon receipt of the loyalty program form in step 398.

The tag produces a unique hash that is distinctive and exclusive for the particular interaction. This hash is included as a query string parameter, URL with UID and Counter mirroring.

Figure 7:
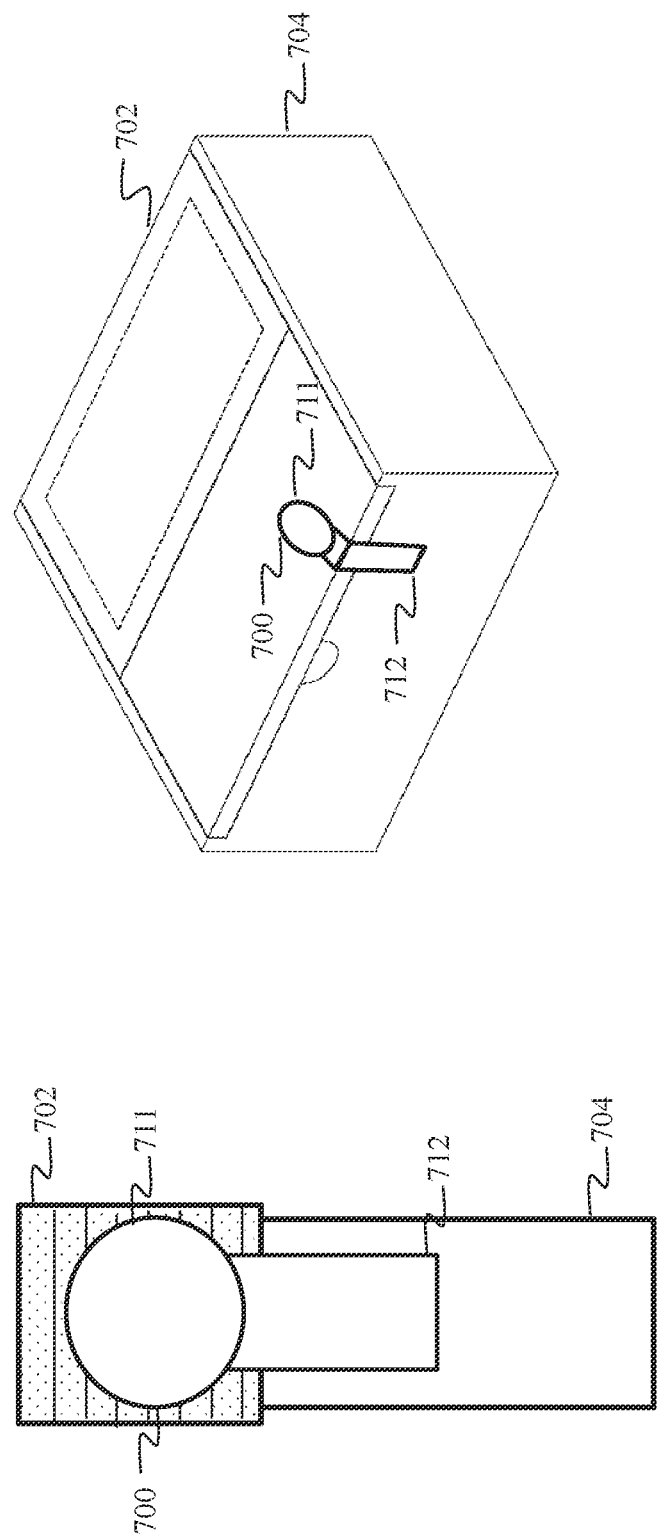
FIG. 7 presents two drawings depicting a tag on a consumer product, according to an example embodiment.

FIG. 7 presents two drawings depicting a tag 700 on a consumer product, according to an example embodiment. The left drawing in FIG. 7 shows the top of an alcoholic beverage bottle or container, which may be liquor, beer, wine, spirits or any other beverage containing alcohol and located in a container. The container comprises a stationary reservoir 704 and a movable cap, plug or cork 702. The tag 700 comprises a main portion 711, which may have a round shape, wherein the main portion is attached to the movable cap, plug or cork 702, such as via adhesive. The tag 700 also comprises a lead portion 712, which may have a rectangular shape, wherein the lead portion is attached to the stationary reservoir 704, such as via adhesive. When the movable cap, plug or cork 702 is removed or otherwise moved by the consumer, the main portion 711 is detached from the lead portion 712, which cuts or otherwise alters conductive terminals or conductive lead lines in the tag 700. Said detachment is detectable by the tag 700, which is configured to record that the alcoholic beverage product has been opened.

The right drawing in FIG. 7 shows a cigar box. The cigar box comprises a stationary box 704 and a movable top 702. The tag 700 comprises a main portion 711 attached to the movable top 702, such as via adhesive. The tag 700 also comprises a lead portion 712 attached to the stationary box 704, such as via adhesive. When the movable top 702 is opened or otherwise moved by the consumer, the main portion 711 is detached from the lead portion 712, which cuts or otherwise alters conductive terminals or conductive lead lines in the tag 700. Said detachment is detectable by the tag 700, which is configured to record that the cigar box has been opened.

Figure 6:
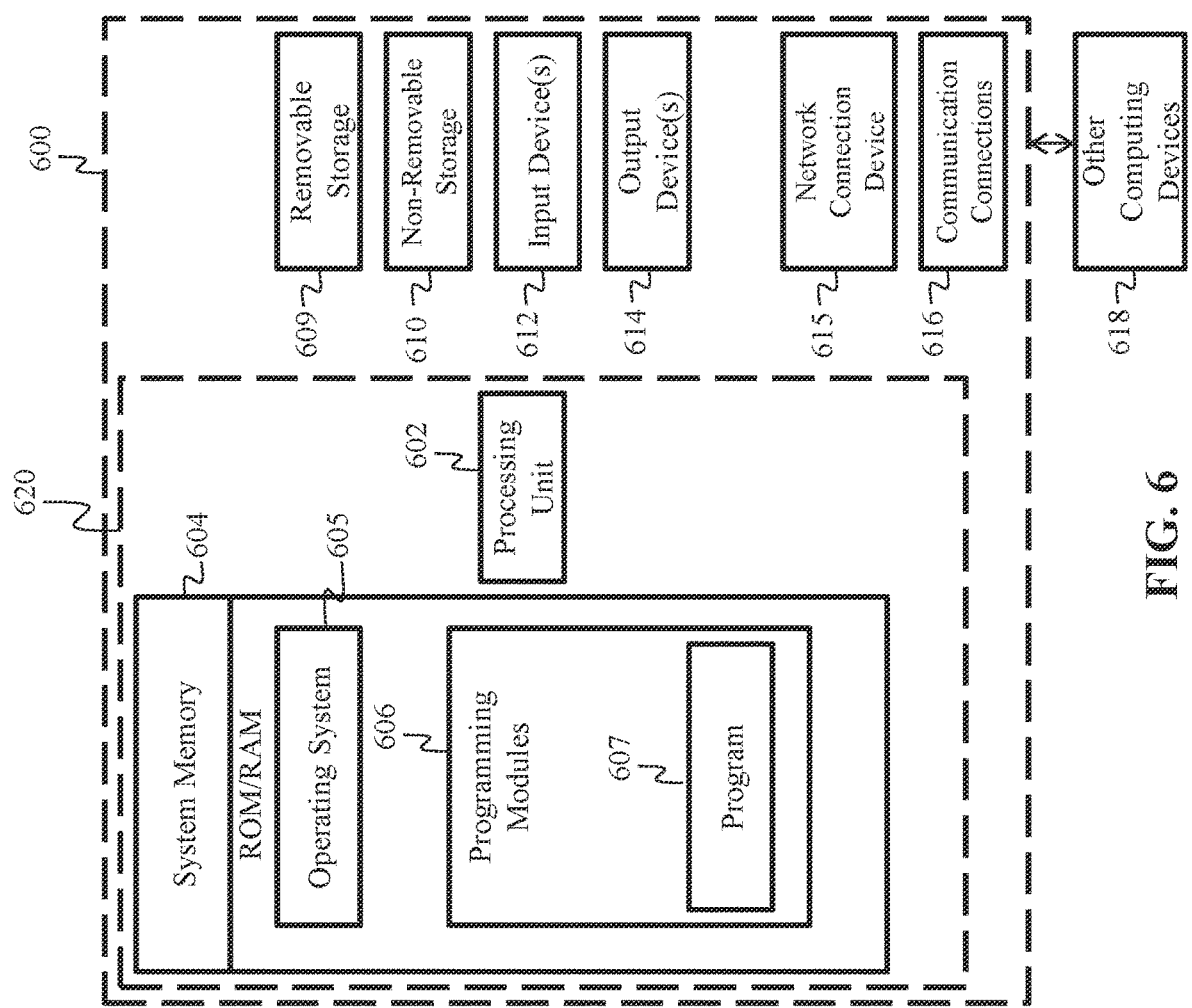
FIG. 6 is a block diagram of a system including a computing device, according to an example embodiment.

FIG. 6 is a block diagram of a system including an example computing device 600 and other computing devices. Consistent with the embodiments described herein, the aforementioned actions performed by device 102, device 120 may be implemented in a computing device, such as the computing device 600 of FIG. 6. Any suitable combination of hardware, software, or firmware may be used to implement the computing device 600. The aforementioned system, device, and processors are examples and other systems, devices, and processors may comprise the aforementioned computing device. Furthermore, computing device 600 may comprise an operating environment for system 100 and processes 200, 250, 270, 300, 350, 370, as described above. Processes 200, 250, 270, 300, 350, 370 may operate in other environments and are not limited to computing device 600.

With reference to FIG. 6, a system consistent with an embodiment may include a plurality of computing devices, such as computing device 600. In a basic configuration, computing device 600 may include at least one processing unit 602 and a system memory 604. Depending on the configuration and type of computing device, system memory 604 may comprise, but is not limited to, volatile (e.g. random-access memory (RAM)), non-volatile (e.g. read-only memory (ROM)), flash memory, or any combination or memory. System memory 604 may include operating system 605, and one or more programming modules 606. Operating system 605, for example, may be suitable for controlling computing device 600's operation. In one embodiment, programming modules 606 may include, for example, a program module 607 for executing the actions of device 102, device 120. Furthermore, embodiments may be practiced in conjunction with a graphics library, other operating systems, or any other application program and is not limited to any particular application or system. This basic configuration is illustrated in FIG. 6 by those components within a dashed line 620.

Computing device 600 may have additional features or functionality. For example, computing device 600 may also include additional data storage devices (removable and/or non-removable) such as, for example, magnetic disks, optical disks, or tape. Such additional storage is illustrated in FIG. 6 by a removable storage 609 and a non-removable storage 610. Computer storage media may include volatile and nonvolatile, removable and non-removable media implemented in any method or technology for storage of information, such as computer readable instructions, data structures, program modules, or other data. System memory 604, removable storage 609, and non-removable storage 610 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 600. Any such computer storage media may be part of device 600. Computing device 600 may also have input device(s) 612 such as a keyboard, a mouse, a pen, a sound input device, a camera, a touch input device, etc. Output device(s) 614 such as a display, speakers, a printer, etc. may also be included. Computing device 600 may also include a vibration device capable of initiating a vibration in the device on command, such as a mechanical vibrator or a vibrating alert motor. The aforementioned devices are only examples, and other devices may be added or substituted.

Computing device 600 may also contain a network connection device 615 that may allow device 600 to communicate with other computing devices 618, such as over a network in a distributed computing environment, for example, an intranet or the Internet. Device 615 may be a wired or wireless network interface controller, a network interface card, a network interface device, a network adapter or a LAN adapter. Device 615 allows for a communication connection 616 for communicating with other computing devices 618. Communication connection 616 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media.

As stated above, a number of program modules and data files may be stored in system memory 604, including operating system 605. While executing on processing unit 602, programming modules 606 (e.g. program module 607) may perform processes including, for example, one or more of the stages of the processes 200, 250, 270, 300, 350, 370 as described above. The aforementioned processes are examples, and processing unit 602 may perform other processes. Other programming modules that may be used in accordance with embodiments herein may include electronic mail and contacts applications, word processing applications, spreadsheet applications, database applications, slide presentation applications, drawing or computer-aided application programs, etc.

Generally, consistent with embodiments herein, program modules may include routines, programs, components, data structures, and other types of structures that may perform particular tasks or that may implement particular abstract data types. Moreover, embodiments herein may be practiced with other computer system configurations, including handheld devices, multiprocessor systems, microprocessor-based or programmable consumer electronics, minicomputers, mainframe computers, and the like. Embodiments herein may also be practiced in distributed computing environments where tasks are performed by remote processing devices that are linked through a communications network. In a distributed computing environment, program modules may be located in both local and remote memory storage devices.

Furthermore, embodiments herein may be practiced in an electrical circuit comprising discrete electronic elements, packaged or integrated electronic chips containing logic gates, a circuit utilizing a microprocessor, or on a single chip (such as a System on Chip) containing electronic elements or microprocessors. Embodiments herein may also be practiced using other technologies capable of performing logical operations such as, for example, AND, OR, and NOT, including but not limited to mechanical, optical, fluidic, and quantum technologies. In addition, embodiments herein may be practiced within a general-purpose computer or in any other circuits or systems.

Embodiments herein, for example, are described above with reference to block diagrams and/or operational illustrations of methods, systems, and computer program products according to said embodiments. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments have been described, other embodiments may exist. Furthermore, although embodiments herein have been described as being associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages and/or inserting or deleting stages, without departing from the claimed subject matter.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for authenticating a consumer product comprising an alcoholic beverage, the method comprising:
    coupling a near field communication (NFC) tag to the consumer product, wherein said NFC tag is programmed to provide the following identifying data to an NFC-capable mobile computing device when said NFC tag is tapped or scanned: a unique product identifier, a URL containing an encrypted packet that uniquely identifies said NFC tag, and a counter value that represents a number of times said NFC tag has been tapped or scanned, wherein the NFC tag comprises a main portion adhered to a stationary portion of the alcoholic beverage, and a lead portion adhered to a movable portion of the alcoholic beverage, wherein when the movable portion is moved, the lead portion is detached from the main portion, and the NFC tag is configured to record that the alcoholic beverage has been opened;
    storing in a database data about a plurality of consumer products, including a product name, a unique product identifier, a counter value, a hash algorithm and a unique identifier, wherein said database is communicatively coupled to a communications network;
    executing a mobile application on an NFC-capable mobile computing device communicatively coupled to the communications network, wherein said mobile application is configured to read identifying data from the NFC tag and transmit said identifying data to a server via the communications network;
    receiving, on the server communicably coupled with the communications network, said identifying data from the mobile application;
    accessing, by the server, a record in the database that corresponds to the unique product identifier;
    comparing, by the server, the hash in the identifying data to a hash algorithm in the record, and comparing the counter value of the identifying data to a counter value in the record;
    if the hash in the identifying data matches the hash algorithm in the record, and if the counter value of the identifying data matches the counter value in the record, then transmitting, by the server, an approval of authentication to the mobile application; and
    sending to the mobile application a pairing suggestion for the consumer product.

2. The method of claim 1, wherein the NFC tag is further programmed to provide the following identifying data to an NFC-capable mobile computing device when said NFC tag is tapped or scanned: a value that indicates whether the consumer product has been opened.

3. The method of claim 2, wherein the server is further configured for: transmitting to the mobile application the value that indicates whether the consumer product has been opened.

4. The method of claim 1, wherein the NFC tag is further programmed to provide the following data to an NFC-capable mobile computing device when said NFC tag is tapped or scanned: a log of temperature and humidity data regarding shipment and storage of the consumer product.

5. The method of claim 4, wherein the server is further configured for: transmitting to the mobile application the log of temperature and humidity data regarding shipment and storage of the consumer product.

6. The method of claim 5, wherein the server is further configured for: transmitting to the mobile application exclusive commercial content relating to the consumer product, including audio, video, and augmented reality media.

7. The method of claim 6, wherein the server is further configured for: transmitting to the mobile application information such as pairings related to the consumer product.

8. The method of claim 7, wherein the server is further configured for: transmitting to the mobile application information about joining a consumer loyalty program.

9. The method of claim 8, wherein the server is further configured for: transmitting to the mobile application information about social media accounts related to the consumer product.

10. The method of claim 9, wherein the server is further configured for: transmitting to the mobile application URL to a manufacturer website for purchasing the consumer product an additional time.

* * * * *